United States Patent
Tsung et al.

(10) Patent No.: US 10,755,169 B2
(45) Date of Patent: Aug. 25, 2020

(54) HYBRID NON-UNIFORM CONVOLUTION TRANSFORM ENGINE FOR DEEP LEARNING APPLICATIONS

(71) Applicant: MediaTek Inc., Hsinchu (TW)

(72) Inventors: Pei-Kuei Tsung, New Taipei (TW); Chien-Hung Lin, Hsinchu (TW); Yao-Sheng Wang, Tainan (TW); Po-Yu Chen, Kaohsiung (TW)

(73) Assignee: MediaTek Inc., Hsinchu (TW)

( * ) Notice: Subject to any disclaimer, the term of this patent is extended or adjusted under 35 U.S.C. 154(b) by 459 days.

(21) Appl. No.: 15/841,733

(22) Filed: Dec. 14, 2017

(65) Prior Publication Data

US 2019/0114536 A1 Apr. 18, 2019

Related U.S. Application Data

(60) Provisional application No. 62/573,184, filed on Oct. 17, 2017.

(51) Int. Cl.
| | | |
|---|---|---|
| G06N 3/063 | (2006.01) | |
| G06F 17/15 | (2006.01) | |
| G06N 3/04 | (2006.01) | |
| G06N 3/08 | (2006.01) | |
| G06F 7/544 | (2006.01) | |
| G06F 7/48 | (2006.01) | |

(52) U.S. Cl.
CPC ........... *G06N 3/063* (2013.01); *G06F 7/5443* (2013.01); *G06F 17/156* (2013.01); *G06N 3/04* (2013.01); *G06N 3/0454* (2013.01); *G06N 3/08* (2013.01); *G06F 7/4806* (2013.01)

(58) Field of Classification Search
CPC ..................................................... G06F 7/156
See application file for complete search history.

(56) References Cited

U.S. PATENT DOCUMENTS

| | | | | |
|---|---|---|---|---|
| 10,169,298 B1* | 1/2019 | Lu | ........................... | G06F 17/14 |
| 2018/0293777 A1* | 10/2018 | Sarel | ...................... | G06N 3/063 |
| 2018/0307980 A1* | 10/2018 | Barik | ................... | G06N 3/0445 |
| 2019/0042923 A1* | 2/2019 | Janedula | ................. | G06N 3/04 |

OTHER PUBLICATIONS

Lavin et al, "Fast Algorithms for Convolutional Neural Networks," arXiv:1509.09308v2 [cs.NE], 2015.

* cited by examiner

*Primary Examiner* — Chuong D Ngo
(74) *Attorney, Agent, or Firm* — Tong J. Lee

(57) ABSTRACT

A system performs convolution operations based on an analysis of the input size. The input includes data elements and filter weights. The system includes multiple processing elements. Each processing element includes multipliers and adders, with more of the adders than the multipliers. According to at least the analysis result which indicates whether the input size matches a predetermined size, the system is operative to select a first mode or a second mode. In the first mode, a greater number of the adders than the multipliers are enabled for each processing element to multiply transformed input and to perform an inverse transformation. In the second mode, an equal number of the adders and the multipliers are enabled for each processing element to multiply-and-accumulate the input. One or more of the multipliers are shared by the first mode and the second mode.

20 Claims, 5 Drawing Sheets

HYBRID NON-UNIFORM CONVOLUTION TRANSFORM ENGINE FOR DEEP LEARNING APPLICATIONS

CROSS-REFERENCE TO RELATED APPLICATIONS

This application claims the benefit of U.S. Provisional Application No. 62/573,184 filed on Oct. 17, 2017, the entirety of which is incorporated by reference herein.

TECHNICAL FIELD

Embodiments of the invention relate to computer architectures for deep learning computing.

BACKGROUND

Deep learning has gained wide acceptance for its superior performance in the fields of computer vision, speech recognition, natural language processing, bioinformatics, and the like. Deep learning is a branch of machine learning that uses artificial neural networks containing more than one hidden layer. One type of artificial neural network, called convolutional neural network (CNN), has been used by deep learning over large data sets such as image data. CNNs have shown excellent results in image applications. For example, CNNs can be used in feature extraction. From raw image pixels received at the input end, a CNN can generate scores for different classes of features at the output end.

Computational workloads of CNNs are intensive. The core computation of a CNN is convolution, which involves a high-order nested loop. For feature extraction, a CNN convolves input image pixels with a set of two-dimensional (2D) filters over a set of channels (e.g., red, green and blue), followed by nonlinear computations, down-sampling computations, and class scores computations. The convolution computations have been shown to be highly resource-demanding. In addition to the CNN, convolution computations are frequently used to solve scientific and engineering problems. Thus, there is a need for efficient convolution computations to achieve performance improvement.

SUMMARY

In one embodiment, a system is provided for performing convolution operations. The system comprises: circuitry to generate an analysis result for the convolution operations according to a size of input which includes data elements and filter weights; and a plurality of processing elements coupled to the circuitry. Each processing element further includes multipliers and adders, with more of the adders than the multipliers. According to at least the analysis result which indicates whether the size of the input matches a predetermined size, the circuitry is operative to select a first mode or a second mode. In the first mode, a greater number of the adders than the multipliers are enabled for each processing element to multiply transformed input and to perform an inverse transformation. In the second mode, an equal number of the adders and the multipliers are enabled for each processing element to multiply-and-accumulate the input. One or more of the multipliers are shared by the first mode and the second mode.

In another embodiment, a method is provided for performing convolution operations. The method comprises: generating an analysis result for the convolution operations according to a size of input which includes data elements and filter weights; and according to at least the analysis result which indicates whether the size of the input matches a predetermined size, selecting one of a first mode and a second mode in each of a plurality of processing elements. Each processing element includes multipliers and adders, with more of the adders than the multipliers. One or more of the multipliers are shared by the first mode and the second mode. Selecting the first mode further comprises: enabling a greater number of the adders than the multipliers to multiply transformed input and to perform an inverse transformation. Selecting the second mode further comprises: enabling an equal number of the adders and the multipliers to multiply-and-accumulate the input.

The embodiments of the invention enable efficient convolution computations by selecting an operation mode suitable for the input size. The multipliers in the system are shared by different operation modes. Advantages of the embodiments will be explained in detail in the following descriptions.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1:
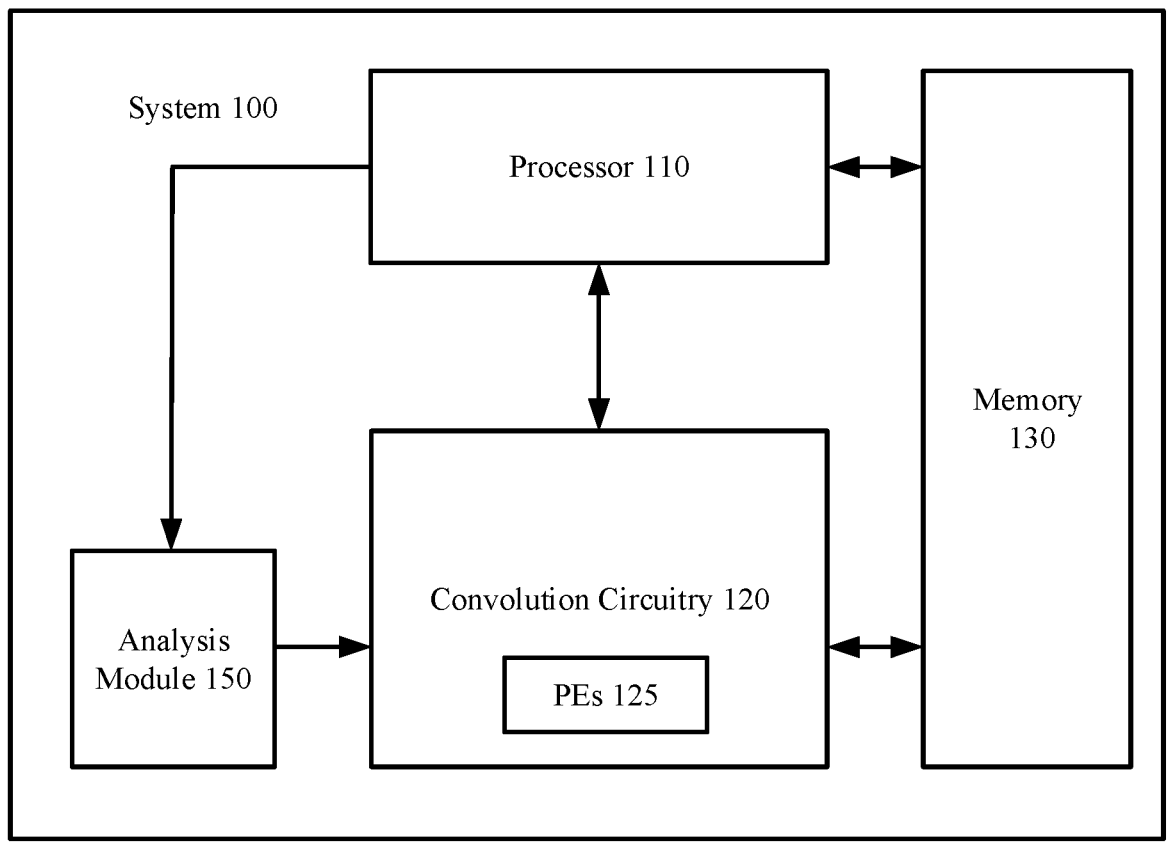
FIG. 1 illustrates a system for performing convolution operations according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a system and method for efficient convolution operations. The system includes multiple processing elements, with each processing element including more adders than multipliers. The system also includes an analyzer, which selectively enables the adders and the multipliers for the convolution operations according to the size of input that includes data elements and filter weights. If the input size matches a predetermined size, a greater number of the adders than the multipliers are enabled such that the convolution is performed in a transformed domain. If the input size does not match any of the predetermined sizes, in one embodiment, an equal number of the adders and the multipliers are enabled such that the convolution is performed directly on the input. In an alternative embodiment, if the input size does not match any of the predetermined sizes, the system may generate instructions for the convolution in a transformed domain based on the input size such that utilization of available adders and multipliers can be maximized.

In the following, convolution computation is described in the context of deep learning applications; e.g., the CNN. It is understood that the convolution computation techniques described herein may be applied to any applications or problems for which convolution is computed.

Before describing the hardware architecture for convolution computations, it may be useful to describe some terminologies in the CNN computations. Typically, filters used for CNN computations are small in size compared to the input image size. For example, a filter may be composed of 5×5 filter weights; that is, 5 filter weights along the width dimension and 5 filter weights along the height dimension. An input image may have hundreds or thousands or more pixels in each of the width and the height dimensions, and may be subdivided into tiles (i.e., blocks) such as 4×4 blocks for convolution operations. In addition to width and height, an input image has a depth dimension, which may be the number of color channels in the input image. During a convolution pass, a filter slides across the width and/or height of the input image and dot products are computed between the filter weights and the image pixel values at any position. As the filter slides over the input image, a 2D output feature map is generated. The output feature map is a representation of the filter response at every spatial position of the input image. When multiple filters are applied to an input image, multiple output feature maps are generated. Each output feature map is generated with the use of a filter, and different output feature maps can be used to detect different features in the input image.

According to the Convolution Theorem, convolution in one domain (e.g., time domain) equals element-wise multiplication in the other domain (e.g., frequency domain). However, conversions between the space and frequency domains incur a non-negligible overhead. The overhead may dynamically change according to the size of filter and size of the image. For deep learning applications, the convolution size is typically small; for example, an input image may be partitioned into tiles of 2×2, 4×4 or 8>8 pixels, and each filter applied to the image may have 3×3 or 5×5 of filter weights. There are several fast algorithms known for reducing the arithmetic complexity of convolution by performing computations in a transformed domain; for example, the Winograd Algorithm (Winograd, "Arithmetic complexity of computations," volume 33, SIAM 1980) and its variations for small convolution sizes such as the Winograd Minimal Filtering Algorithm (Lavin and Gray, "Fast Algorithms for Convolutional Neural Networks" in arXiv 2015). In this disclosure, the Winograd Algorithm and its variations are collectively referred to as the "Winograd transform."

The Winograd transform converts convolution operations into a set of additions and multiplications, where the number of additions is greater than the number of multiplications. In comparison, conventional convolution (also referred to as "direct convolution") computation uses equal (or substantially equal) number of multiplications and additions. For the same convolution problem, the Winograd transform uses fewer multiplications than the direct convolution.

FIG. 1 illustrates an example of a system 100 in which embodiments of the invention may operate. The system 100 includes one or more processors (referred to herein as the processors 110), such as one or more central processing units (CPUs) or other general-purpose and/or special-purpose processing circuitry. The processors 110 are coupled to convolution circuitry 120 for performing convolution computations. The convolution circuitry 120 is the execution engine or the transform engine for computing convolutions. The convolution circuitry 120 may include a plurality of hardware components, referred to as processing elements (PEs) 125, each of which further includes arithmetic components, such as one or more of: multipliers, adders, accumulators, etc. The PE 125 may be arranged as one or more arrays. The arithmetic components in each PE 125 may be selectively enabled or disabled according to signals from an analysis module 150.

In one embodiment, the output of the convolution circuitry 120 may be sent to the processors 110, which performs a combination of nonlinear operations, looping operations, fully-connected neural network operations, and the like, as needed for a specific deep learning application. In one embodiment, the processors 110 and the convolution circuitry 120 in combination act as a feature extractor, which is capable of extracting a given feature (e.g., a car, a person, a boat, etc.) from a given input image. Alternatively, the processors 110 and the convolution circuitry 120 may perform CNN computations for a number of deep learning applications not limited to the description above. In another embodiment, the processors 110 and the convolution circuitry 120 in combination may perform other scientific or engineering calculations that are related or unrelated to the CNN.

The system 100 also includes a memory 130, which may include volatile and/or non-volatile memory devices such as random access memory (RAM), flash memory, read-only memory (ROM), etc. The memory 130 may be located on-chip (i.e., on the same chip as the processors 110) and include caches, register files and buffers made of RAM devices. Alternatively or additionally, the memory 130 may include off-chip memory devices which are part of a main memory, such as dynamic random access memory (DRAM) devices. The memory 130 may be accessible by the PEs 125 in the convolution circuitry 120. The system 100 may be part of a computing device, communication device, or a combination of computing and communication device.

At runtime of the system 100, the analysis module 150 detects the input size including the filter size and the data element size, and compares the input size with a set of one or more predetermined sizes. The result of the comparison, which is also referred to as the analysis result, indicates whether the input size match a predetermined size. For example, a predetermined size may be 4×4 for input data size (i.e., four data elements by four data elements for each data block), and 3×3 for filter size (i.e., three filter weights by three filter weights for each filter). The system 100 may provide multiple predetermined sizes for which instructions for the Winograd transform are stored in the memory 130 accessible by the analysis module 150. In one embodiment, the instructions may be stored as a function, subroutine, method, etc., in a library of instructions. The instructions may be retrieved at runtime by the processors 110 as needed.

In one embodiment, if the input size matches a predetermined size, the analysis module 150 generates a mode select signal selecting a first mode. If the input size does not match any of the predetermined sizes, the analysis module 150 generates a mode select signal selecting a second mode. According to the mode select signal, the convolution circuitry 120 selectively enables the adders and the multipliers in each PE 125 for performing the convolution operations. In an alternative embodiment, the analysis module 150 may directly send enable signals and/or disable signals to the adders and multipliers in the convolution circuitry 120.

According to the embodiment of FIG. 1, the analysis module 150 may be a hardware component, such as a general-purpose processor or special-purpose circuitry, coupled to the processors 110. The analysis module 150 may also be coupled to the convolution circuitry 120 to send mode select signals or enable/disable signals to the convolution circuitry 210 to perform the convolution operations.

Figure 2:
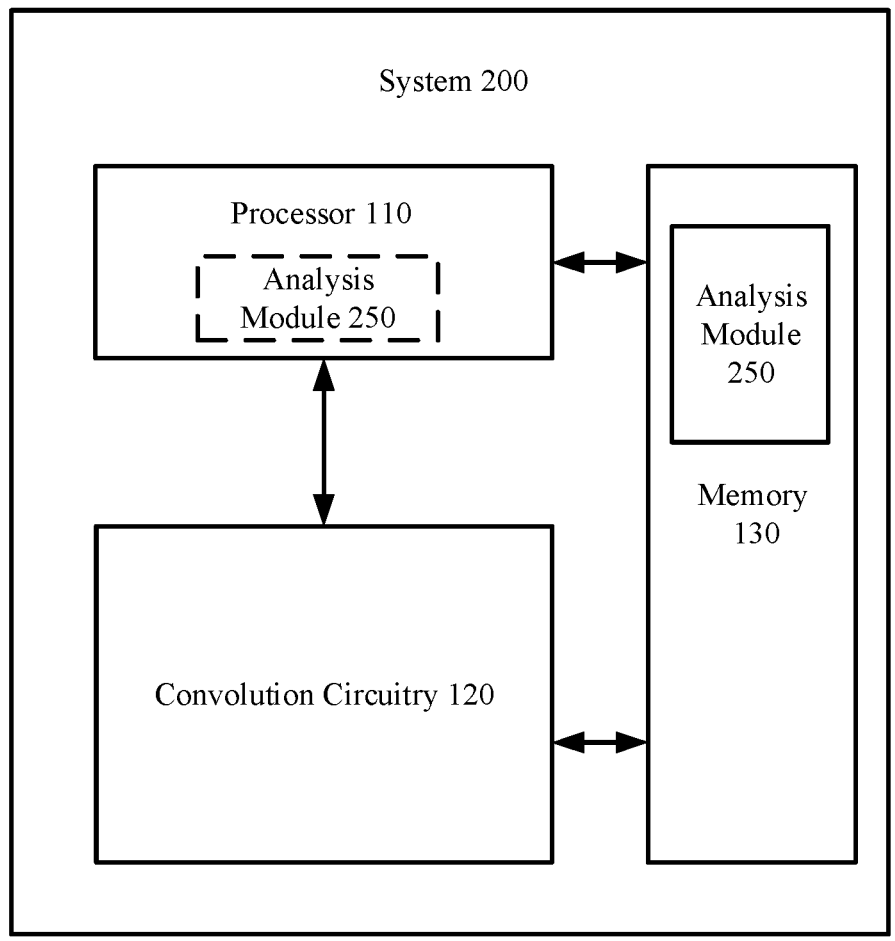
FIG. 2 illustrates a system for performing convolution operations according to an alternative embodiment.

FIG. 2 illustrates a system 200 according to an alternative embodiment. The system 200 is the same as the system 100 except for an analysis module 250. The analysis module 250 is or includes a software program composed of instructions and data. The software program may be stored in the memory 130 and may be loaded into the processors 110 (indicated by the dotted block) for execution. The software program contains machine-readable instructions executable by the processors 110. In one embodiment, the analysis module 250 may be part of a compiler. The analysis module 250 may cause the processors 110 to generate mode select signals or enable/disable signals for the convolution circuitry 210 to perform convolution operations. In one embodiment, the analysis module 250 may generate instructions for the PEs 125 to perform the Winograd transform when such instructions are not accessible by the system 200 or do not exist in the system 200.

In yet another embodiment, the analysis module 250 may reside on another computing platform and communicate with the convolution circuitry 120 via a network.

In the following, the analysis module 150 and the system 100 of FIG. 1 are sometimes used as an example in the explanations of FIG. 3 and FIG. 4. However, it should be understood that the operations performed by the analysis module 150 and the system 100 can likewise be performed by the analysis module 250 and the system 200 of FIG. 2.

Figure 3:
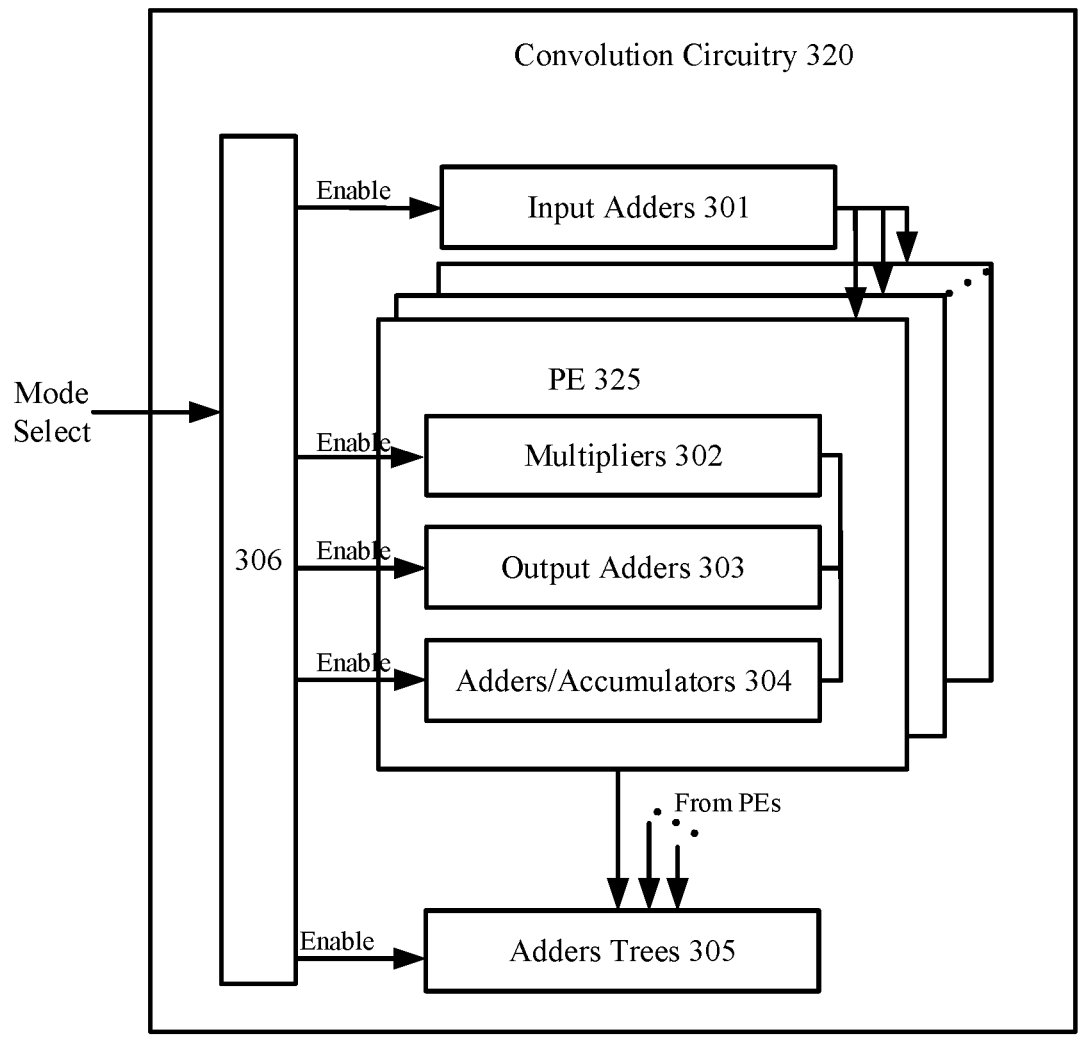
FIG. 3 illustrates a first embodiment of convolution circuitry.

FIG. 3 illustrates convolution circuitry 320 according to a first embodiment. The convolution circuitry 320 is one example of the convolution circuitry 120 of FIG. 1 and FIG. 2. The convolution circuitry 320 includes a set of input adders 301 coupled to a plurality of PEs 325. The PEs 325 are an example of the PEs 125 of FIG. 1 and FIG. 2. Each PE 325 includes a set of multipliers 302, a set of output adders 303, and a set of adders/accumulators (referred to as the accumulators 304 for simplicity).

When the analysis result indicates that the input size matches a predetermined size, the input adders 301, the multipliers 302 and the output adders 303 are enabled to perform the Winograd transform. The accumulators 304 may be disabled. In one embodiment, the analysis module 150 generates a first mode select signal to cause a controller 306 to generate the corresponding enable signals and disable signals. The input adders 301, when enabled, are operative to transform input data elements and filter weights into transformed data elements and transformed filter weights, respectively. Some or all of the PEs 325 may share the output of the input adders 301, or the output of at least a subset of the input adders 301. The multipliers 302 and the output adders 303 in each PE 325 may use the transformed data elements and the transformed filter weights as input. According to the Winograd transform, the multipliers 302 multiply the transformed data elements with the transformed filter weights, and the output adders 303 perform an inverse transformation on the multiplication products to generate the convolution output. Each output adder 303 may have more bits than each input adder 301. For example, each input adder 301 may be an 8-bit adder, and each output adder 303 may be a 16-bit adder.

When the analysis result indicates that the input size does not match any of the predetermined sizes, in one embodiment, the multipliers 302 and the accumulators 304 are enabled to perform direct convolution. The direct convolution may be computed by multiply-and-accumulate (MAC) operations; that is, data elements are multiplied by filter weights, and the products are accumulated to generate the convolution output. In one embodiment, each accumulator 304 is an adder whose output is fed into one of its input ports until the accumulation terminates. The output adders 303 may be disabled. In one embodiment, the analysis module 150 generates a second mode select signal to cause the controller 306 to generate the corresponding enable signals and disable signals. Each accumulator 304 may have more bits than each multiplier 302. For example, each accumulator 304 may be a 24-bit adder, and each multiplier may be an 8-bit multiplier.

In another embodiment, when the analysis result indicates that the input size does not match any of the predetermined sizes, the analysis module 150 generates instructions for the convolution operations according to the input size, and enables the input adders 301, the multipliers 302 and the output adders 303 accordingly. The generated instructions may maximize the numbers of the adders and the multipliers utilized in each PE 325 for performing the convolution operations. Each PE 325 executes the generated instructions to multiply the transformed input and to perform the inverse transformation according to the Winograd transform. This instructions-generation scenario is referred to as the third mode. The third mode is similar to the first mode in terms of the underlying convolution algorithm, except that in the third mode the instructions are generated according to the input size of a given convolution problem (i.e., the convolution to be computed at runtime) when the given convolution problem is received by the system 200. In the embodiment of FIG. 2 where the analysis module 250 is part of a compiler, the instructions in the third mode may be generated according to the input size at the compile time. By comparison, the instructions in the first mode are pre-generated and stored in memory according to one or more predetermined input sizes before the given convolution problem is received.

In some embodiments, the determination of selecting the second mode or the third mode may be made according to a configuration of the software program that contains the convolution operations. For example, a programmer may set a flag or directives in the program indicating the MAC operations in the second mode (alternatively, the instructions-generation in the third mode) as the default when the input size does not match any of the predetermined sizes. Alternatively or additionally, the determination may be made according to the overhead of the transformation incurred by the Winograd transform, where the overhead may be a function of the input size. Other factors, such as system workload, hardware utilization, etc., may also be taking into account in the determination.

The convolution circuitry 320 may additionally include a set of adder trees 305. Each adder tree 305 includes a number of adders organized as a tree structure. The tree structure enables fast calculation of accumulation for the MAC operations. In one embodiment as shown in FIG. 3, the adder trees 305 are outside the PEs 325 but coupled to the PEs 325 to receive the convolution outputs from three or more of the PEs 325 and to combine their outputs by accumulation. In another embodiment, the accumulators 304 may be arranged as an adder tree, in addition or alternative to the adder trees 305 to carry out the accumulations in the MAC operations. In yet another embodiment (not shown), the adder trees 305 may be distributed within the PEs 325, such that each PE 325 includes a number of the adders in the adder trees 305.

In one embodiment, the adder trees 305 may be used for both multiplications and additions in the MAC operations for certain filter weights; e.g., for filter weights that are limited to the set of {−1, 0, 1} (i.e., when each filter weight is −1, 0 or 1). In one embodiment, each adder in the adder trees 305 may have more number of bits than each input adder 301; e.g., each adder in the adder trees 305 may be a 24-bit adder and each input adder 301 may be an 8-bit adder.

In one embodiment, when the first mode is selected, a greater number of adders (e.g., the output adders 303) than multipliers (e.g., the multipliers 302) are enabled for each PE 325 to perform the Winograd transform. Alternatively, when the second mode is selected, an equal number of multipliers (e.g., the multipliers 302) and adders (e.g., the accumulators 304) are enabled for each PE 325 to perform the MAC operations for direct convolution. When the third mode is selected, a combination of the input adders 301, the multipliers 302, the output adders 303 and the adder trees 305 may be enabled according to the generated instructions. The generated instructions may maximize the numbers of the adders and the multipliers utilized in each PE 325 for performing the convolution operations.

Figure 4:
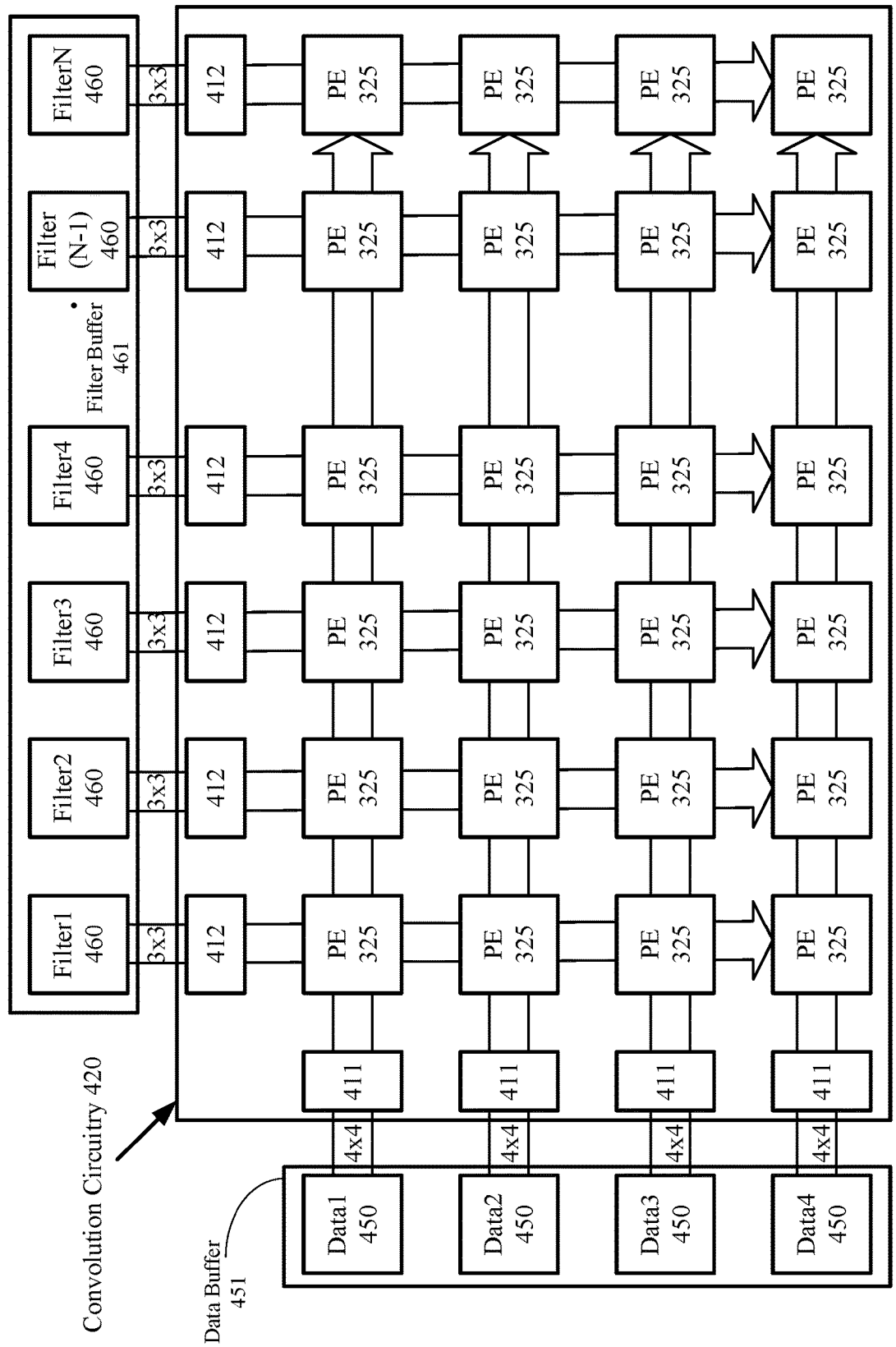
FIG. 4 illustrates a second embodiment of convolution circuitry.

FIG. 4 illustrates convolution circuitry 420 according to an alternative embodiment. The convolution circuitry 420 is one example of the convolution circuitry 120 of FIG. 1 and FIG. 2. The convolution circuitry 320 includes a two-dimensional array of the PEs 325 (FIG. 3) organized in rows and columns. The PEs 325 are coupled to a data buffer 451 via input adders 411, and a filter buffer 461 via input adders 412. In this example, the data buffer 451 stores a plurality of 4×4 data blocks 450, and each data block 450 may be transformed according to the Winograd transform by the input adders 411. The filter buffer 461 in this example stores a plurality of 3×3 filter weights 460, and each 3×3 filter weights 460 may be transformed according to the Winograd transform by the input adders 412. In some embodiments, the convolution circuitry 420 in the first mode may execute the Winograd transform on data blocks 450 and filter weights 460 with a range of different predetermined sizes.

Referring also to FIG. 3, when the analysis result indicates that the input size matches a predetermined size (i.e., the first mode), the input adders 411 and 412 as well as the multipliers 302 and the output adders 303 in each PE 325 are enabled to perform the Winograd transform. Each PE 325 as shown in the left-most column of FIG. 4 is to receive transformed data elements, and to pass them horizontally to the other PEs 325 in the same row such that all of the PEs 325 in the same row can share the same transformed data elements. Each PE 325 as shown in the top-most row is to receive transformed filter weights, and to pass them vertically to the other PEs 325 in the same column such that all of the PEs 325 in the same column can share the same transformed filter weights.

Similarly, when the third mode is selected, the input adders 411 and 412 as well as the multipliers 302 and the output adders 303 in each PE 325 are enabled to perform the Winograd transform according to instructions generated by the analysis module 250 (FIG. 2). The transformed data elements and the transformed filter weights are shared by the PEs 325.

When the second mode is selected, the input adders 411 and 412 as well as the output adders 303 in each PE 325 may be disabled. The multipliers 302 and the accumulators 304 are enabled to perform the MAC operations for direct convolution.

Although not shown in FIG. 4, the convolution circuitry 420 may also include the adder trees 350 for performing fast accumulations and/or the MAC operations (including both multiplications and additions) when the filter weights are in the set of {−1, 0, 1}.

Figure 5:
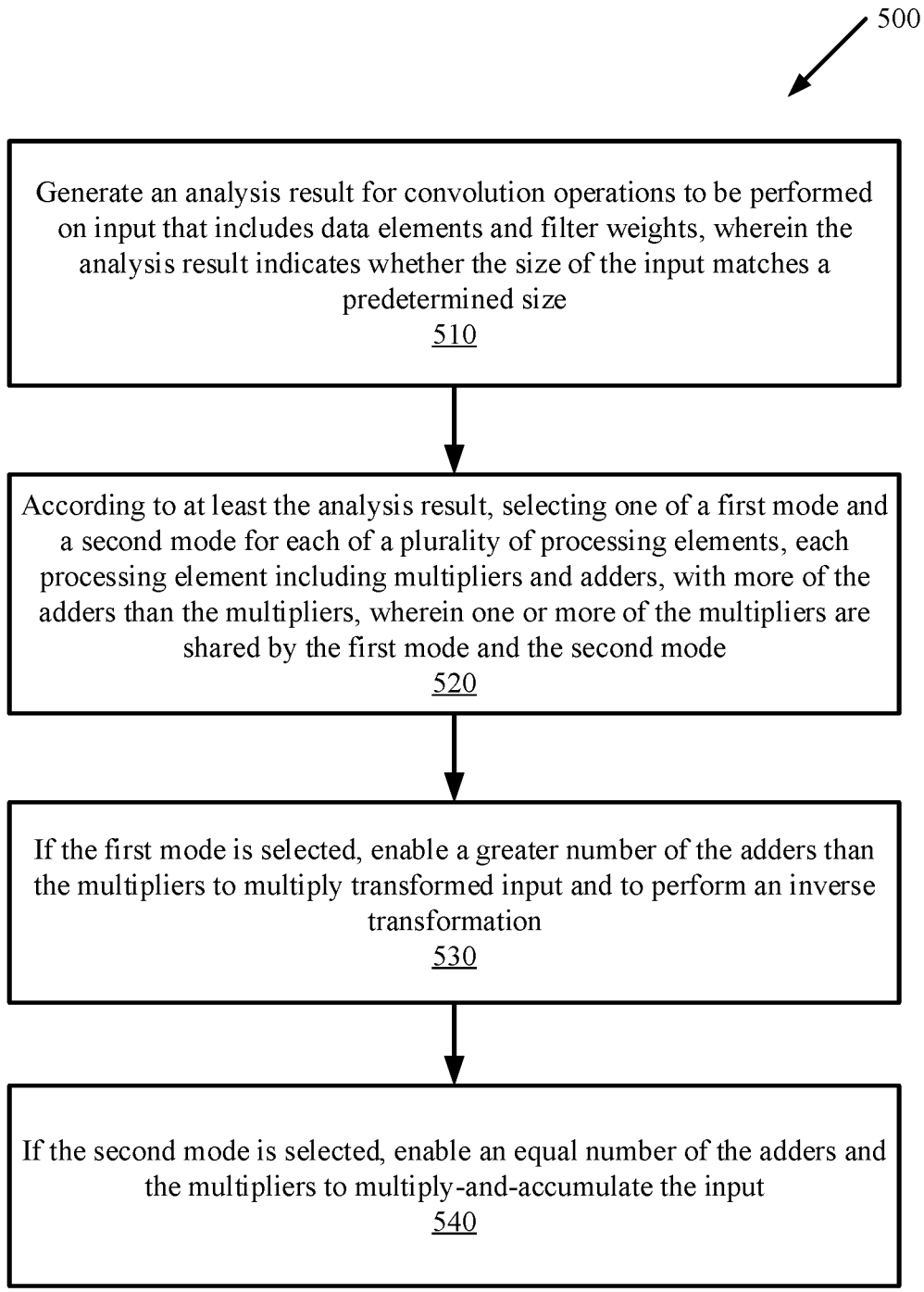
FIG. 5 is a flow diagram illustrating a method for performing convolution operations according to one embodiment.

FIG. 5 is a flow diagram illustrating a method 500 for performing convolution operations according to one embodiment. In one embodiment, the method 500 may be performed by a system (e.g., the system 100 of FIG. 1 or the system 200 of FIG. 2).

The method 500 begins with the system generates an analysis result for convolution operations to be performed on input, wherein the input includes data elements and filter weights (step 510). The analysis result indicates whether the size of the input matches a predetermined size. More specifically, the analysis result may be generated by the analysis module 150 of FIG. 1 (e.g., hardware circuitry) or the analysis module 250 of FIG. 2 (e.g., software executed by processor circuitry). According to at least the analysis result, the system selects one of a first mode and a second mode (i.e., the first mode or the second mode) for each PE (step 520). Each PE includes multipliers and adders, and there are more adders than the multipliers in each PE. Moreover, one or more of the multipliers are shared by the first mode and the second mode. If the first mode is selected, the system enables a greater number of the adders than the multipliers to multiply transformed input and to perform an inverse transformation (step 530). If the second mode is selected, the system enables an equal number of the adders and the multipliers to multiply-and-accumulate the input (step 540).

In one embodiment, a non-transitory computer-readable medium stores thereon instructions that, when executed on one or more processors of the system, cause the system to perform the method 500 of FIG. 5.

The operations of the flow diagram of FIG. 5 have been described with reference to the exemplary embodiments of FIGS. 1 and 2. However, it should be understood that the operations of the flow diagram of FIG. 5 can be performed by embodiments of the invention other than the embodiments discussed with reference to FIGS. 1 and 2, and the embodiments discussed with reference to FIGS. 1 and 2 can perform operations different than those discussed with reference to the flow diagram. While the flow diagram of FIG. 5 shows a particular order of operations performed by certain embodiments of the invention, it should be understood that such order is exemplary (e.g., alternative embodiments may perform the operations in a different order, combine certain operations, overlap certain operations, etc.). For example, steps 530 and 540 may be performed in any order depending on the mode selected at different times.

Various functional components or blocks have been described herein. As will be appreciated by persons skilled in the art, the functional blocks will preferably be implemented through circuits (either dedicated circuits, or general purpose circuits, which operate under the control of one or more processors and coded instructions), which will typically comprise transistors that are configured in such a way as to control the operation of the circuitry in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A system for performing convolution operations, comprising:
   circuitry to generate an analysis result for the convolution operations according to a size of input which includes data elements and filter weights; and
   a plurality of processing elements coupled to the circuitry, each processing element further comprising multipliers and adders with more of the adders than the multipliers;
   wherein, according to at least the analysis result which indicates whether the size of the input matches a predetermined size, the circuitry is operative to select:
   a first mode, in which a greater number of the adders than the multipliers are enabled for each processing element to multiply transformed input and to perform an inverse transformation, or
   a second mode, in which an equal number of the adders and the multipliers are enabled for each processing element to multiply-and-accumulate the input,
   wherein one or more of the multipliers are shared by the first mode and the second mode.

2. The system of claim 1, wherein when the analysis result indicates the size of the input matches a predetermined size, each processing element is operative to execute predetermined instructions to multiply the transformed input and to perform the inverse transformation.

3. The system of claim 1, wherein when the analysis result indicates the size of the input does not match a predetermined size, each processing element is operative to perform the multiply-and-accumulate to convolve the data elements with the filter weights.

4. The system of claim 1, wherein when the analysis result indicates the size of the input does not match a predetermined size, the circuitry is operative to generate instructions for the convolution operations based on the size of the input, and each processing element is operative to execute the generated instructions to multiply the transformed input and to perform the inverse transformation.

5. The system of claim 4, wherein the generated instructions maximizes the numbers of the adders and the multipliers utilized in each processing element for performing the convolution operations.

6. The system of claim 1, further comprising:
   a set of input adders shared by the processing elements, wherein each input adder when enabled is operative to transform the data elements and the filter weights into the transformed input.

7. The system of claim 1, wherein transformation of the input and the inverse transformation are performed according to a Winograd transform.

8. The system of claim 1, wherein each processing element further comprises:
   an adder tree including a subset of the adders coupled to the multipliers, wherein the adder tree is arranged as a tree structure which, when enabled, performs accumulation operations for the multiply-and-accumulate.

9. The system of claim 8, wherein the adder tree, when enabled, performs the multiply-and-accumulate when each filter weight is one of: −1, 0 and 1.

10. The system of claim 1, further comprising:
    an adder tree coupled to three or more of the processing elements, the adder tree including a set of additional adders which, when enabled, accumulates outputs from the three or more of the processing elements.

11. A method for performing convolution operations, comprising:
    generating an analysis result for the convolution operations according to a size of input which includes data elements and filter weights; and
    according to at least the analysis result which indicates whether the size of the input matches a predetermined size, selecting one of a first mode and a second mode in each of a plurality of processing elements, each processing element including multipliers and adders with more of the adders than the multipliers, wherein one or more of the multipliers are shared by the first mode and the second mode,
    wherein selecting the first mode further comprises: enabling a greater number of the adders than the multipliers to multiply transformed input and to perform an inverse transformation, and
    wherein selecting the second mode further comprises: enabling an equal number of the adders and the multipliers to multiply-and-accumulate the input.

12. The method of claim 11, wherein when the analysis result indicates the size of the input matches a predetermined size, the method further comprising:
    executing predetermined instructions to multiply the transformed input and to perform the inverse transformation.

13. The method of claim 11, wherein when the analysis result indicates the size of the input does not match a predetermined size, the method further comprising:
    performing the multiply-and-accumulate to convolve the data elements with the filter weights.

14. The method of claim 11, wherein when the analysis result indicates the size of the input does not match a predetermined size, the method further comprising:
    generating instructions for the convolution operations based on the size of the input; and
    executing the generated instructions to multiply the transformed input and to perform the inverse transformation.

15. The method of claim 14, wherein the generated instructions maximizes the numbers of the adders and the multipliers utilized in each processing element for performing the convolution operations.

16. The method of claim 11, further comprising:
    transforming the data elements and the filter weights into the transformed input using a set of input adders; and
    sending the transformed input from each input adder to multiple ones of the processing elements that share the input adder.

17. The method of claim 11, further comprising:
    performing transformation of the input and the inverse transformation according to a Winograd transform.

18. The method of claim 11, further comprising:
    enabling an adder tree, which includes a subset of the adders arranged as a tree structure, to perform accumulation operations for the multiply-and-accumulate.

19. The method of claim 18, wherein the adder tree, when enabled, performs the multiply-and-accumulate when each filter weight is one of: −1, 0 and 1.

20. The method of claim 11, further comprising:
enabling an adder tree, which includes a set of additional adders arranged as a tree structure, to accumulate outputs from three or more of the processing elements.

* * * * *